United States Patent
Nishide

(10) Patent No.: US 8,373,779 B2
(45) Date of Patent: Feb. 12, 2013

(54) IMAGING APPARATUS, SIGNAL PROCESSING CIRCUIT, SIGNAL PROCESSING APPARATUS, SIGNAL PROCESSING METHOD, AND COMPUTER PROGRAM PRODUCT

(75) Inventor: Yoshiaki Nishide, Osaka (JP)

(73) Assignee: Sony Corporation, Tokyo (JP)

( * ) Notice: Subject to any disclaimer, the term of this patent is extended or adjusted under 35 U.S.C. 154(b) by 518 days.

(21) Appl. No.: 12/060,671

(22) Filed: Apr. 1, 2008

(65) Prior Publication Data

US 2008/0246861 A1 Oct. 9, 2008

(30) Foreign Application Priority Data

Apr. 3, 2007 (JP) ................ P2007-097594

(51) Int. Cl.
*H04N 5/208* (2006.01)
*H04N 5/00* (2011.01)
*G06K 9/40* (2006.01)
(52) U.S. Cl. ............... 348/252; 348/607; 382/261
(58) Field of Classification Search ............ 348/27.252, 348/607, 252, 581; 382/261; 341/50
See application file for complete search history.

(56) References Cited

U.S. PATENT DOCUMENTS

| | | | | |
|---|---|---|---|---|
| 2003/0030753 A1* | 2/2003 | Kondo et al. | ................. | 348/625 |
| 2003/0048958 A1* | 3/2003 | Ishiguro | ................. | 382/261 |
| 2004/0119858 A1* | 6/2004 | Shimazaki | ................. | 348/252 |
| 2006/0170978 A1* | 8/2006 | Gao et al. | ................. | 358/3.26 |

FOREIGN PATENT DOCUMENTS

| | | |
|---|---|---|
| JP | 8 65673 | 3/1996 |
| JP | 8 237669 | 9/1996 |
| JP | 10 173488 | 6/1998 |
| JP | 2004 282442 | 10/2004 |
| JP | 2006 50358 | 2/2006 |
| JP | 2006 128774 | 5/2006 |
| JP | 2006 209578 | 8/2006 |
| JP | 2006 222479 | 8/2006 |
| JP | 2006 246080 | 9/2006 |

* cited by examiner

*Primary Examiner* — Aung S Moe
*Assistant Examiner* — Mekonnen Dagnew
(74) *Attorney, Agent, or Firm* — Frommer Lawrence & Haug LLP; William S. Frommer

(57) ABSTRACT

A signal processing method is provided. The method includes: generating an output signal containing a high-precision component at a level not determined by quantization of an input digital signal by subjecting each of pixels constituting the input digital signal to a predetermined filter operation such that a set of predetermined number of pixels including a target pixel and surrounding pixels thereof is obtained, the operation is carried out on the surrounding pixels when a variation from the target pixel is within a predetermined threshold range, and the operation is carried out on the target pixel when a variation from the target pixel is out of the predetermined threshold range; separating the high precision component from the signal output from the edge-preserving smoothing filter; and adding the high precision component separated from the high-precision component separating part to the input digital signal.

6 Claims, 7 Drawing Sheets

8 BITS

FIG. 3A-1 RELATED ART
FIG. 3A-2 RELATED ART
FIG. 3B RELATED ART
FIG. 3C RELATED ART
FIG. 3D RELATED ART
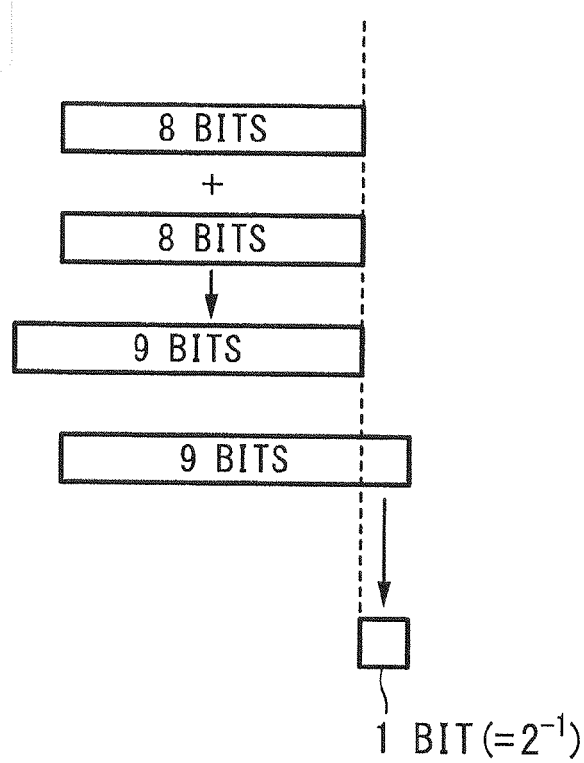
FIG. 4A RELATED ART
FIG. 4B RELATED ART
FIG. 4C RELATED ART
FIG. 4D RELATED ART
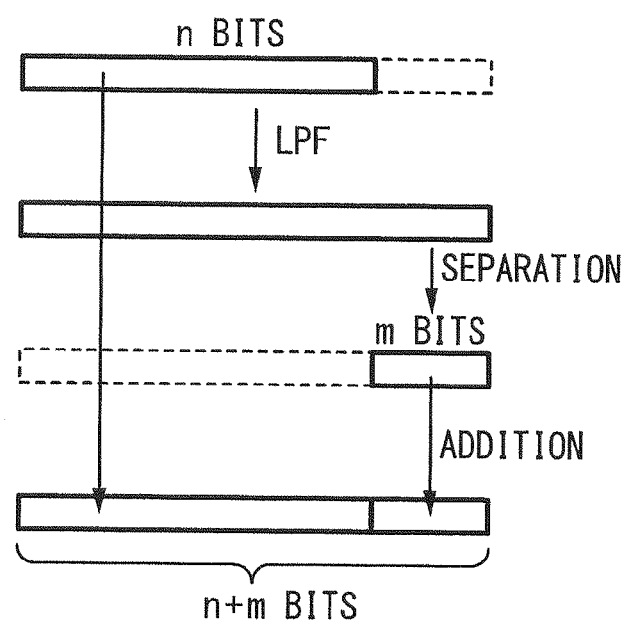

ND COMPUTER
IMAGING APPARATUS, SIGNAL PROCESSING CIRCUIT, SIGNAL PROCESSING APPARATUS, SIGNAL PROCESSING METHOD, AND COMPUTER PROGRAM PRODUCT

CROSS REFERENCE TO RELATED APPLICATIONS

The present invention contains subject matter related to Japanese Patent Application 2007-097594 filed in the Japanese Patent Office on Apr. 3, 2007, the entire contents of which being incorporated herein by reference.

BACKGROUND OF THE INVENTION

1. Field of the Invention

The invention relates to an imaging apparatus, a signal processing circuit, a signal processing apparatus, a signal processing method, and a computer program product. In particular, the invention relates to a technology applied to any of them in which information, at a level not determined by quantization, of an original signal is reproduced from a video signal output as a digital signal.

2. Description of the Related Art

When converting an analog signal to a digital signal, the amount of information in the digital signal can be determined by a sampling frequency and the number of quantization bits (quantization bit rate). The sampling frequency determines the maximum frequency that can be represented by the Nyquist's theorem, while the quantization bit rate determines the accuracy in the direction of amplitude. In other words, the quantization bit rate determines the minimum variation of the digital signal. If the minimum variation determined by the quantization bit rate is too large with respect to the signal expressed, human beings will perceive so-called quantization distortion.

Therefore, for preventing the quantization distortion from being obvious, the dynamic range of analog signal input to an analog-to-digital converter (hereinafter, referred to as an A/D converter) is adjusted in advance to the dynamic range of the A/D converter. However, if such processing is carried out, information, at a level not determined by quantization in the A/D convertor, of an original signal may disappear.

FIG. 1A illustrates an example of the waveform of an analog signal input into an A/D converter. FIG. 1B illustrates an example of the waveform of a signal when the dynamic range of the analog signal input into the A/D converter is adjusted to the dynamic range of the A/D converter. In this example, the A/D converter has a quantization bit rate of 8 bits. The example shown in FIG. 1B illustrates that the information corresponding to a high accuracy portion over the range of 8 bits as indicated by the arrow in the figure disappears when passing through the A/D converter.

In addition, the digital-signal processing in a video camera or the like may lead to a phenomenon in which the minimum variation of a digital signal becomes too large with respect to an expressed signal. For example, if a steep gain adjustment is performed when shooting in a dark place or the like, the least significant bit data of the original signal will be shifted to high-order bits. As a result, there may be a disadvantage in that an expressed video may have impression of insufficient gray scale. A similar disadvantage may occur when carrying out a gamma correction for correcting the gamma characteristics of signals of three primary colors to fit to the gamma characteristics of a monitor.

While having these disadvantages, an effective measure for smoothly expressing the gray scale of an output signal is to increase the quantization bit rate. However, the performance of the A/D converter is typically limited. Thus, optionally increasing the quantization bit rate is difficult. Besides, in view of the production costs, there is a case where an A/D converter with a high quantization bit rate may not be used.

Without an increase in quantization bit rate in the A/D converter, for example, there is a method of expanding the number of bits in the direction of the least significant bit of a signal output from the A/D converter and random noise is incorporated into the expanded portion. Another method, which has been employed in the art, is to reproduce a high precision component, at a level not determined by quantization in the A/D convertor, of an original signal from a digital signal after A/D conversion while retaining the information of the original signal input into the A/D converter.

FIG. 2 represents an example of configuration of a circuit for the reproduction of a high precision component, at a level not determined by quantization, of an original signal. The circuit that reproduces the high precision component at a level not determined by quantization is hereinafter referred to as a quantization-accuracy reproducing circuit. For example, this circuit can be applied to a video camera or the like. In order to correct an insufficient gray scale occurred as a result of raising the least significant bit in an analog-to-digital converted original signal or in a digital signal having a significantly adjusted gain, the circuit generates a high precision component ("m" bits) added to the lowest bit from an original signal ("n" bits) to obtain a quantization bit rate of "n+m" bits.

The quantization-accuracy reproducing circuit includes, for example, a low-pass filter 201, a high-precision component separating part 202, and a high-precision component adding part 203. The low-pass filter 201 generates a digital signal with a bit length of "n'+m", which contains a signal component (high precision component) at a level not determined by quantization. FIGS. 3A to 3D illustrate an example of output of the low-pass filter 201 in the case of m=1. In the example shown in FIGS. 3A to 3D, a digital signal obtained by digitization of an original signal has a signal length "n" of 8 bits.

The low-pass filter 201 calculates an average value of two digital signals to output a signal containing bit information at a level not determined by quantization of the original signal. FIGS. 3A-1 and 3A-2 illustrate two digital signals to be processed, respectively. These signals are 8-bit digital signals and then added together to form a 9-bit output signal as shown in FIG. 3B. In other words, these signals pass through the low-pass filter 201, thereby generating a signal with a bit length of 9 bits (i.e., "n(8)+m(1)" bits=9 bits).

A broken line extending in the vertical direction in FIGS. 3A to 3D indicates the decimal point. The signal shown in FIG. 3B is divided to adjust digits as shown in FIG. 3C. Then, the calculated resulting part (1 bit) after the decimal point as shown in FIG. 3C is a high precision component. As shown in FIGS. 3C and 3D, the high-precision component separating part 202 shown in FIG. 2 carries out the process of separating "m" bits of high-precision component from a signal output from the low-pass filer 201. Subsequently, the high-precision component adding part 203 adds the m bits separated by the high-precision component separating part 202 to the least bit of the "n"-bit digital signal (original signal).

In other words, an "n"-bit original signal as shown in FIG. 4A has lost a component at a level not determined by quantization as indicated by the broken line. However, by passing through the low-pass filter 201, the signal containing the component at a level not determined by quantization can be generated as shown in FIG. 4B. Subsequently, an "m"-bit high-precision component is removed from the above signal by the high-precision component separating part 202. Furthermore, as shown in FIG. 4D, a signal is generated such that the "m"-bit signal separated in FIG. 4C is added to the original "n-bit signal of FIG. 4A by the high-precision component adding part 203. Such a process leads to the reproduction of the high precision component without an increase in quantization bit rate in an A/D converting part.

However, according to the above-described method, reproduction of the high precision component may receive influence of high-frequency components such as edge and noise. In addition, improvement in effects of the reproduction of the quantization accuracy may lead to deterioration of the image quality. Accordingly, a method for detecting a high precision component and controlling the reproduction of the high precision component depending on the amount of the detected high precision component has been employed in the art.

Japanese Unexamined Patent Application Publication No. 2006-222479 discloses that a high precision component is detected and the effects of reproducing a high precision component are then controlled on the basis of the amount of the detected high precision component.

SUMMARY OF THE INVENTION

FIG. 5 illustrates an example of configuration of the quantization-accuracy reproducing circuit as described above. The quantization-accuracy reproducing circuit as shown in FIG. 5 receives a video signal converted into a digital signal by an A/D converter and subjected to gain control in a manner similar to the circuit illustrated in FIG. 2.

The quantization-accuracy reproducing circuit shown in FIG. 5 includes a low-pass filter 201, a high-precision component separating part 202, a high-precision component adding part 203, a high-frequency detecting part 204, and a high-frequency component control output part 205. The low-pass filter 201 generates a digital signal with a bit length of "n+m" from an input "n"-bit original signal. The high-precision component separating part 202 separates a "m"-bit signal (high precision component) from the "n'+m"-bit signal output from the low-pass filter 201. The high-precision component adding part 203 adds the "m"-bit signal (high precision component) to the input "n"-bit original signal, thereby outputting a digital signal with a bit length of "n+m".

The configuration of the quantization-accuracy reproducing circuit as described above with reference to FIG. 5 is the same as one shown in FIG. 2. However, the quantization accuracy circuit shown in FIG. 5 further includes: the high-frequency detecting part 204 that detects the high-frequency component in the "n"-bit original signal; and the high-frequency component control output part 205 for controlling the reproduction effect of quantization accuracy based on the detection result of the high-frequency detecting part 204.

The high-frequency detecting part 204 detects a high-frequency component in an original signal and then output a value depending on the size of the detected high-frequency component. The high-frequency component control output part 205 generates a gain function depending on the magnitude of the output value of the high-frequency detecting part 204. Subsequently, the high-frequency component control output part 205 carries out alpha blending, using the gain function, between an original signal and a quantization accuracy reproduction signal provided with a high precision component. Alternatively, the high precision component generated from the original signal is multiplied with a gain generated depending on the detection result of the high-frequency detecting part 204. The resulting value is added to a quantization accuracy reproduction signal with a bit length of "n+m" output from the high-precision component adding part 203. Such a processing can reproduce the quantization accuracy while retaining substantially all the characteristics of the original signal.

In such a quantization-accuracy reproducing circuit, accuracy of detecting a high frequency is important. In addition, it is also important to appropriately control the reproduction effect of quantization accuracy, in accordance with the detection result of the high-frequency component. If these processes are not carried out suitably, the frequency characteristic of the generated quantization accuracy reproduction signal may deteriorate compared with the original signal. Such a phenomenon may frequently occur as the number of reproduced bits increases. In addition, a linking-like phenomenon may occur in the waveform of a high frequency portion with an extensive change in edge value or the like when the number of the reproduced bits to be added increases.

However, a process may be complicated and a circuitry becomes large if a mechanism for precisely detecting various high frequency components of edges, noise, pictures and so on to prevent the above phenomenon is desired and appropriate control of the reproduction effect of quantization accuracy is realized. For example, the discrete cosine transform (DCT) or the like known as processing of the joint photographic experts group (JPEG) or the like is useful but the process thereof is complicated, thereby resulting in an extremely large circuitry scale.

The invention addresses the above-identified, and other problems associated with conventional methods and apparatuses. It is desirable to provide an imaging apparatus, a signal processing circuit, a signal processing apparatus, a signal processing method, and a computer program product, for carrying out the appropriate reproduction of quantization accuracy without large circuitry.

According to an embodiment of the invention, there is provided an imaging apparatus including an imaging part and an analog/digital converting part for converting a video signal obtained by the imaging part into a digital signal. When the reproduction of quantization accuracy is carried out in the imaging apparatus, a set of predetermined number of pixels including a target pixel and surrounding pixels thereof is obtained with respect to each of the pixels that constitute the video signal output from the analog/digital converting part. The surrounding pixels are subjected to a filter operation when a variation from the target pixel is within a predetermined threshold range. The target pixel is subjected to the filter operation when a variation from the target pixel is out of the predetermined threshold range. Thus, an output signal containing a high precision component at a level not determined by quantization in the analog/digital converting part is generated. Furthermore, the high precision component is separated from the output signal and the high precision component separated from the high-precision component separating part is then added to the signal output from the analog/digital converting part.

The above-described filter processing enables a influence of a high-frequency component to be removed and a high precision component at a level not determined by quantization in the analog/digital converting part to be reproduced.

According to the embodiment of the invention, there is no need to include any additional part, such as a high-frequency detecting part or a high-frequency component control output part. Thus, a high precision component at a level not determined by quantization in the analog/digital converting part can be reproduced while removing the influence of high-

BRIEF DESCRIPTION OF THE DRAWINGS

FIG. 1A illustrates characteristics of a signal before input to the A/D converter and FIG. 1B illustrates characteristics of the signal when output from the A/D converter.

FIGS. 3A to 3D are schematic diagrams illustrating the related-art process of reproducing quantization accuracy, where FIG. 3A-1, FIG. 3A-2, FIG. 3B, FIG. 3C, and FIG. 3D illustrate signals, respectively.

FIGS. 4A to 4D are schematic diagrams illustrating the related-art process of reproducing quantization accuracy, where FIG. 4A, FIG. 4B, FIG. 4C, and FIG. 4D illustrate signals, respectively.

FIG. 8A and FIG. 8B illustrate examples of the filter processing, respectively.

FIG. 9A and FIG. 9B illustrate examples of the filter processing, respectively.

DESCRIPTION OF THE PREFERRED EMBODIMENTS

Figure 1A:
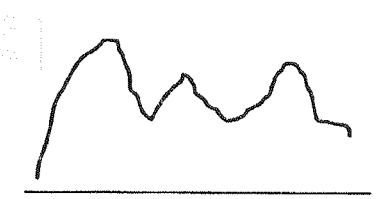
FIGS. 1A and 1B are characteristic charts illustrating an example of losing a high-frequency component in an A/D converter according to related art, where
Figure 1B:
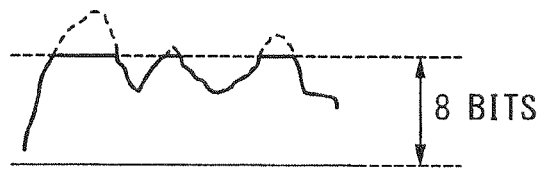
Figure 2:
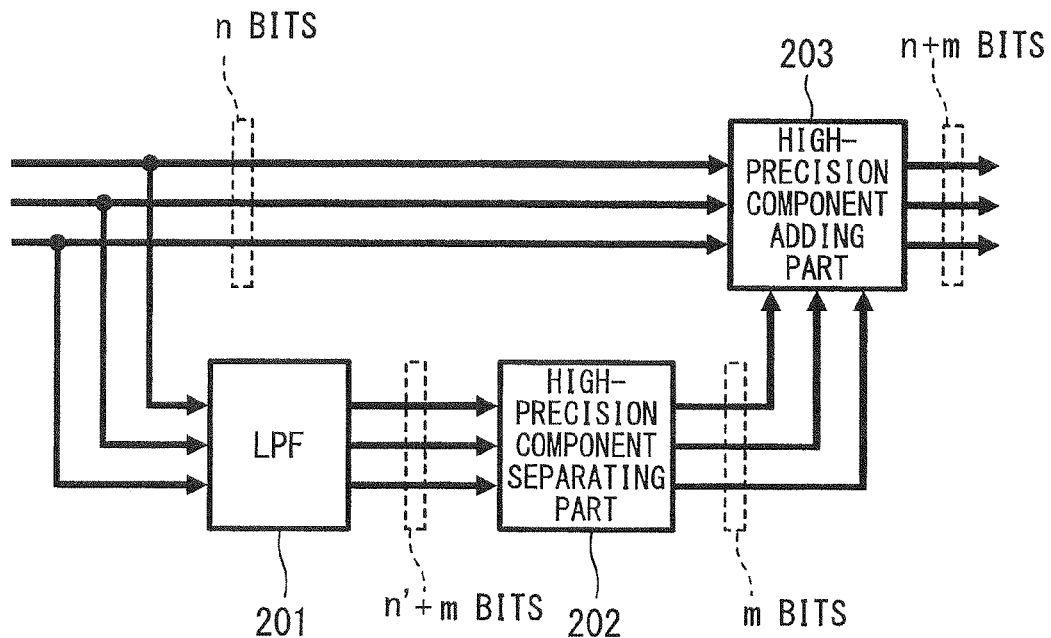
FIG. 2 is a block diagram illustrating an example of configuration of the related-art quantization-accuracy reproducing circuit.
Figure 5:
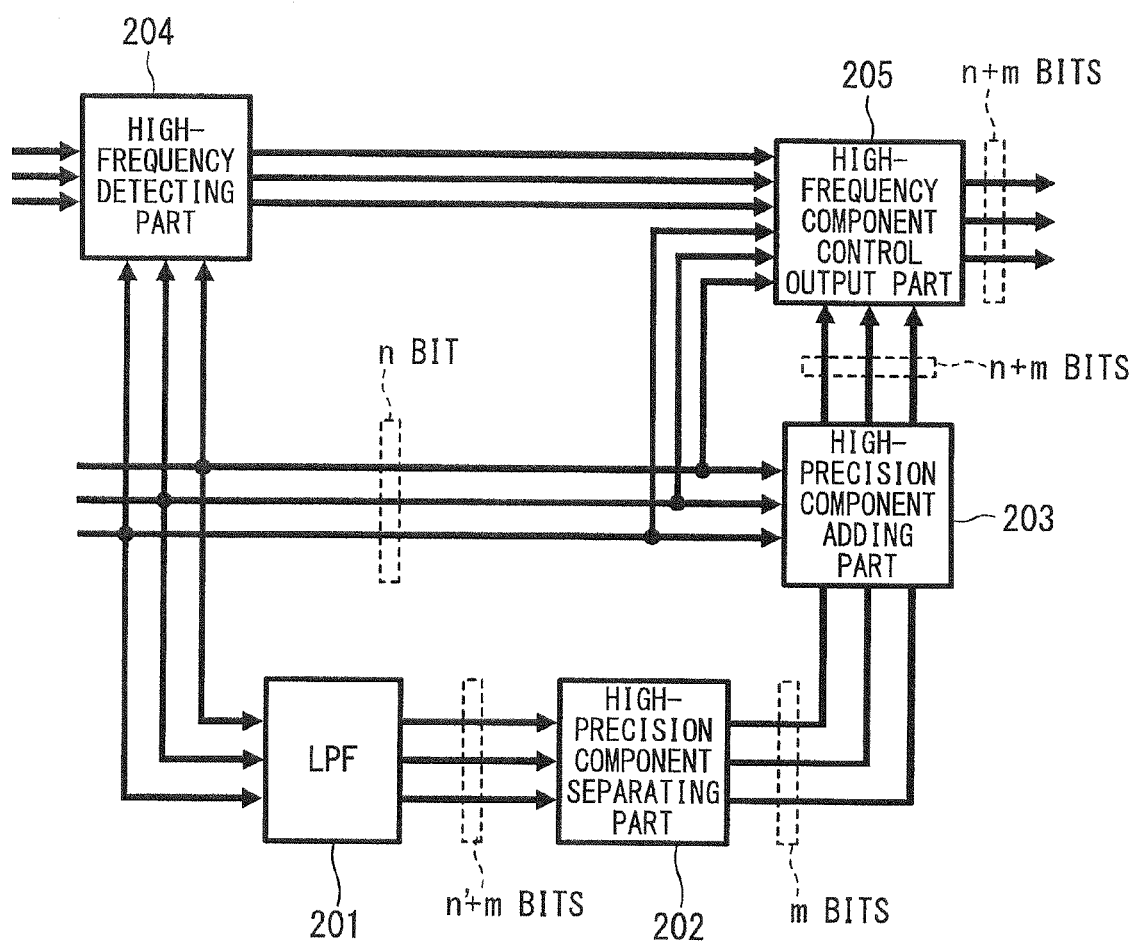
FIG. 5 is a block diagram illustrating an example of configuration of the related-art quantization-accuracy reproducing circuit.
Figure 6:
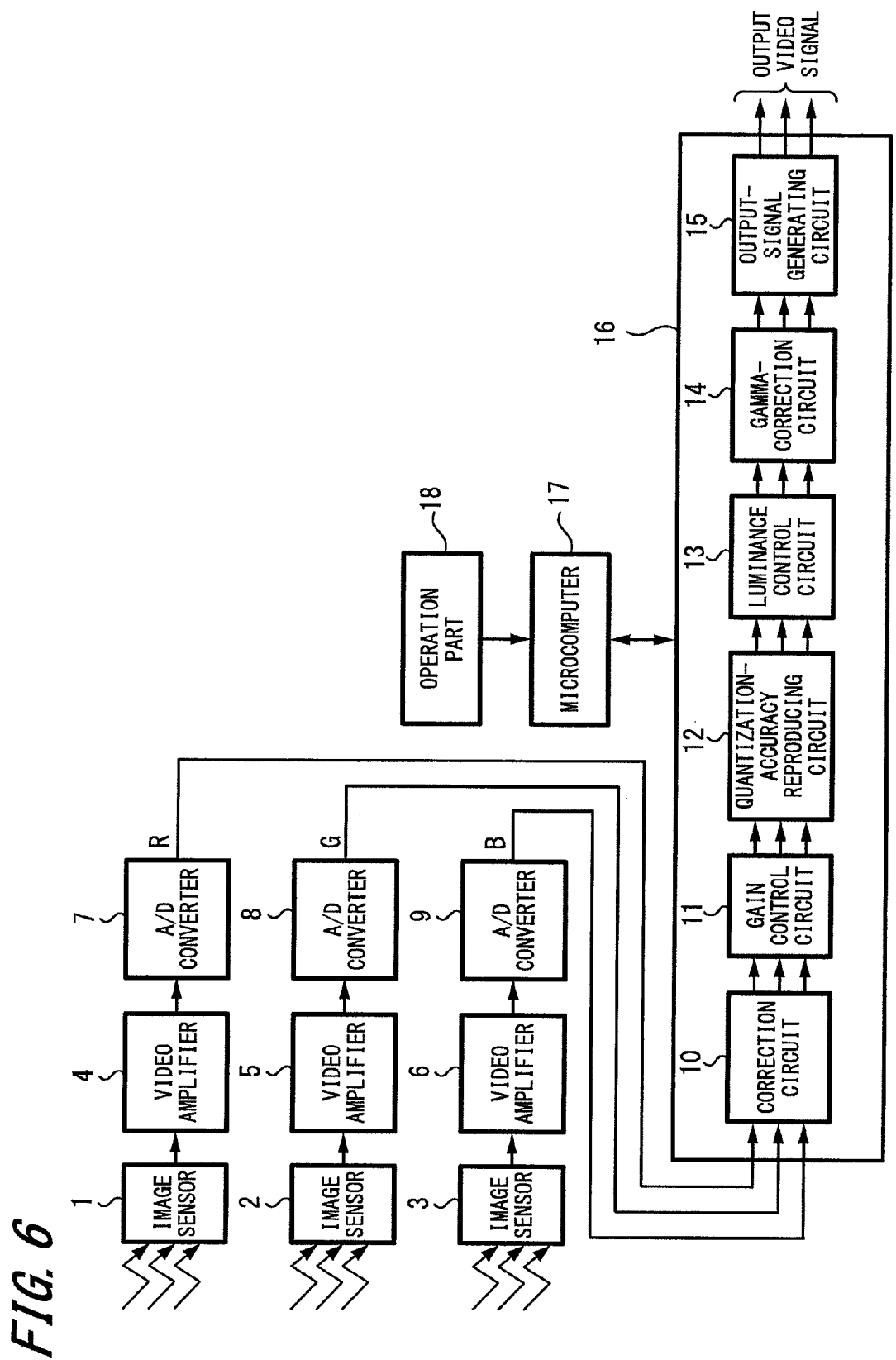
FIG. 6 is a block diagram illustrating an example of inner configuration of a video camera in accordance with an embodiment of the invention.

Hereinafter, an imaging apparatus in accordance with an embodiment of the invention will be described with reference to FIGS. 6 to 10. FIG. 6 is a block diagram illustrating a principle configuration of a video camera to which the imaging apparatus of the embodiment is applied. The video camera shown in FIG. 6 includes image sensors 1, 2, 3, video amplifiers 4, 5, 6, A/D converters 7, 8, 9, a video signal processing part 16, a microcomputer 17, and an operation part 18. The video signal processing part 16 includes a correction circuit 10, a gain control circuit 11, a quantization-accuracy reproducing circuit 12, a luminance control circuit 13, a gamma-correction circuit 14, and an output-signal generating circuit 15.

In the video camera shown in FIG. 6, light from a subject is incident on light-receiving parts of the respective image sensor 1, 2, and 3 through an optical system including lenses (not shown) and the like. Then, light rays of respective colors, red (R), green (G), and blue (B) are photoelectrically converted. In this embodiment, the video camera is provided with three image sensors for red, green, and blue but the number of sensors is not limited thereto. Alternatively, for example, the video camera may be provided with image sensors for four different colors.

The image sensors 1, 2, and 3 generate respective primary color signals constituting a video signal from the light of the subject and then supply the three primary color signals (R signal, G signal, and B signal) to the respective video amplifiers 4, 5, and 6. Here, the video signals may be applied to any of moving pictures and still pictures.

The video amplifiers 4, 5, and 6 are gain control devices such as automatic gain control (AGC) circuits. The video amplifiers 4, 5, and 6 control gains of primary color signals and then supply the primary color signals with controlled gains to the respective A/D converters 7, 8, and 9. Furthermore, the A/D converters 7, 8, and 9 convert input analog signals into digital signals and then supply the converted signals to the video signal processing part 16.

In this embodiment, the video signal processing part 16 includes the correction circuit 10, gain control circuit 11, quantization-accuracy reproducing circuit 12, luminance control circuit 13, gamma-correction circuit 14, and output-signal generating circuit 15. First, primary color signals R, G, and B are adjusted to appropriate levels by the video amplifiers 4, 5, 6 and A/D converters 7, 8, 9 and then the quantized signals are input into the correction circuit 10 of the video signal processing part 16.

The correction circuit 10 carries out an interpolation processing and the associated signal processing thereof such as filter processing and shading processing on the input three primary color signals, followed by supplying the processed signals to the gain control circuit 11.

The gain control circuit 11 adjusts the gains of the three input primary color signals input from the correction circuit 10 to appropriate levels and then supplies the signals to the quantization-accuracy reproducing circuit 12.

The quantization-accuracy reproducing circuit 12 generates a signal with reproduced quantization accuracy, while removing the effects of high frequency components included in the three primary color signals input from the gain control circuit 11. The quantization-accuracy reproducing circuit 12 will be later described in detail.

In order to obtain a video signal in a predetermined luminance range, the luminance control circuit 13 extracts a luminance signal from the signals input from the quantization-accuracy reproducing circuit 12, thereby controlling amplitude characteristics of a high luminance region of the luminance signals. As a result, the dynamic range of the signal output from the image sensor is compressed, followed by supplying the compressed signal to the gamma-correction circuit 14.

The gamma-correction circuit 14 carries out correction on each of the three primary color signals input from the luminance control circuit 13 depending on gamma characteristics of a monitor (receiver), such as a cathode ray tube (CRT) or a liquid crystal display panel, followed by supplying the respective primary color signals with gamma correction to the output-signal generating circuit 15.

The output-signal generating circuit 15 converts the three input primary color signals input from the gamma correction circuit 14 into the final output format of video signals, followed by outputting the converted signals to the outside. For example, the output-signal generating circuit 15 can serve as an encoder circuit. That is, the circuit converts the three primary color signals into color-difference signals so as to conform to such signal standard as the national television system committee (NTSC) system or the phase alternating line (PAL) system, followed by modulating the signals using a sub-carrier signal (not shown). Furthermore, when the signal to be output is an analog signal, the output-signal generating circuit may be configured to include a D/A converter for converting the quantized color-difference signal output from the encoder circuit into an analog signal.

The microcomputer 17 is an example of the control part and controls the respective circuits in the video signal processing part 16. Furthermore, the microcomputer 17 controls operations of respective parts of the optical system, such as lenses (not shown); video amplifiers 4, 5, and 6; and so on. The operation part 18 includes button keys arranged on the video camera, soft keys assigned to icons displayed on the screen of a monitor mounted on the video camera, and so on. An operation signal based on the operation is input into the microcomputer 17 through an interface (not shown). The microcomputer 17 carries out predetermined operations and the control of each circuit in accordance with computer programs based on the operation signal input by the user operating the operation part 18 or specific settings defined in advance or the like. The computer programs are stored in a nonvolatile memory, such as a built-in read only memory (ROM).

Furthermore, the microcomputer 17 is optionally connected to a drive circuit (not shown). A magnetic disk, an optical disk, a magneto-optical disk, a semiconductor memory, or the like is also attached to the microcomputer 17 according to need. A computer program read out of such disk is installed as needed in a RAM or the like included in the microcomputer 17.

In the video camera as configured above, the image sensors 1, 2, and 3 photoelectrically convert an image light of a subject into primary color signals of red (R), green (G), and blue (B). Subsequently, the video amplifiers 4, 5, and 6 and the A/D converter 7, 8, and 9 adjust the primary color signals to analog signals with appropriate levels, followed by converting the analog signals into digital signals by quantization. Each quantized primary color signal is subjected to appropriate correction and gain control processing at the correction circuit 10 and the gain control circuit 11, respectively. Subsequently, the signal is input into the quantization-accuracy reproducing circuit 12. The effects of high-frequency components are eliminated from the signal input into the quantization-accuracy reproducing circuit 12 and the quantization accuracy thereof is then reproduced. Subsequently, the signal with reproduced quantization accuracy is input into the luminance control circuit 13. The signal is subjected to suitable luminance-compression processing in the luminance control circuit 13 and then input into the gamma-correction circuit 14. Each of gamma-corrected primary color signals is converted into the final video signal output format at the output-signal generating circuit 15 to be output.

Figure 7:
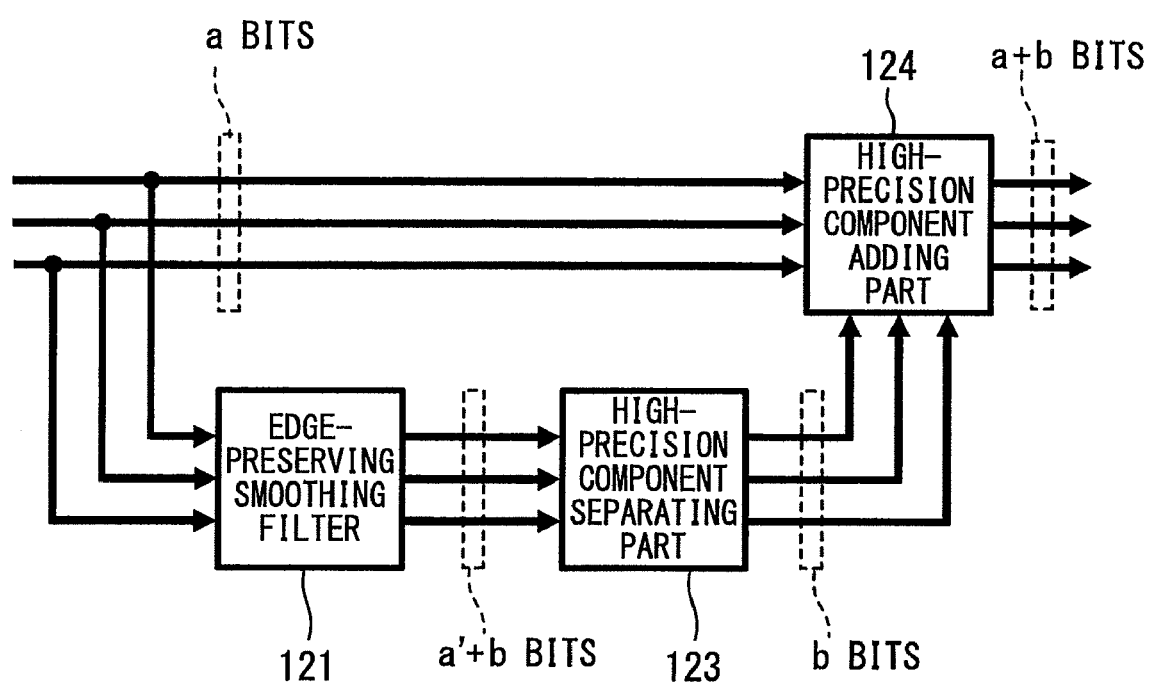
FIG. 7 is a block diagram illustrating an example of inner configuration of a quantization-accuracy reproducing circuit in accordance with an embodiment of the invention.

FIG. 7 illustrates an example of configuration of the quantization-accuracy reproducing circuit 12 included in the video camera shown in FIG. 6. The quantization-accuracy reproducing circuit shown in FIG. 7 includes an edge-preserving smoothing filter 121, a high-precision component separating part 123, and a high-precision component adding part 124. In this example, an epsilon ($\epsilon$) filter may be used as the edge-preserving smoothing filter 121. The epsilon ($\epsilon$) filter has a characteristic of smoothing a small amplitude signal, such as random noise added to a signal while maintaining a component with an unexpected large amplitude change in the signal. The edge-preserving smoothing filter 121 of the embodiment carries out a filter operation on a pixel value among pixel values to be used in the filter operation when variations in these pixel values are not more than a threshold value with reference to a target pixel value. In contrast, if the variations in pixel values from the target pixel value exceed the threshold, the target pixel value is substituted to receive the filter operation. The filter operation is carried out on the pixel value obtained as described above. Consequently, a signal containing a high precision component at a level not determined by quantization is generated. An example of the filter processing of the edge-preserving smoothing filter 121 is illustrated in FIGS. 8 and 9.

Figure 8A:
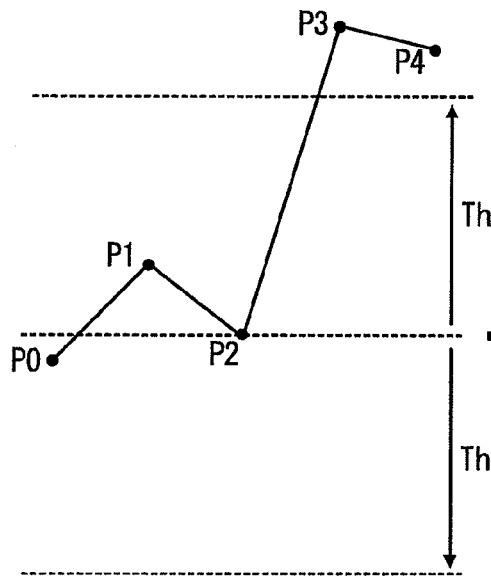
FIGS. 8A and 8B are characteristic charts illustrating an example of filter processing of an edge-preserving smoothing filter in accordance with an embodiment of the invention, where
Figure 9A:
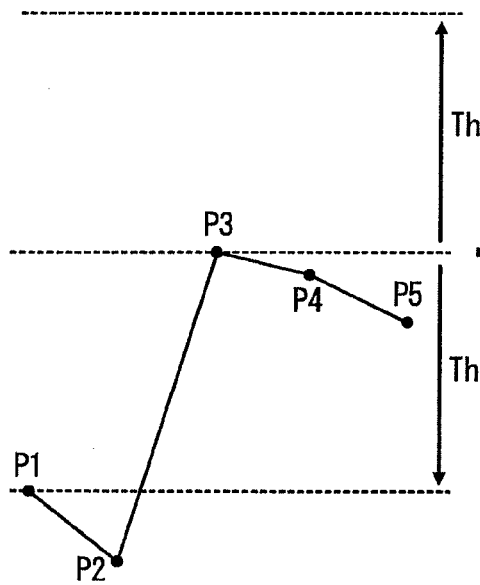
FIGS. 9A and 9B are characteristic charts illustrating another example of filter processing of the edge-preserving smoothing filter in accordance with an embodiment of the invention, where

In this example, the filter processing is carried out on a target pixel located on the center of the filter and four pixels located in the vicinity thereof (five pixels in total). As shown in FIGS. 8A and 9A, the pixels subjected to the filter processing are represented by points P0 to P5, respectively. The arrows represented by "Th" in the vertical direction in the figures represent the range of threshold value. Note that the number of pixels subjected to the filter processing is not limited to five and the number of pixels can be defined optionally.

Figure 8B:
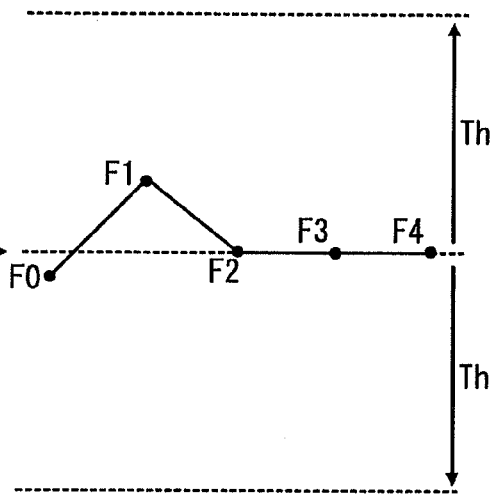

FIG. 8A illustrates that pixel P2 is defined as a target pixel. In addition, FIG. 8A illustrates that the target pixel P2 and the pixels P0, P1, P3, and P4 located in the vicinity thereof receive the filter processing. In the case of pixels P0 and P1, variations from the target pixel P2 fall within the threshold value Th. Thus, the values of pixels P0 and P1 directly receive the filter operation. In contrast, in the case of pixels P3 and P4, variations from the target pixel P2 exceed the threshold value Th. Thus, the target pixel P2 is employed to receive the filter operation. FIG. 8B illustrates the distribution of pixel values receiving filter operation. In this figure, the pixel values are represented as F0 to F4, respectively.

In the case of pixel values P0 and P1 shown in FIG. 8A, variations from the target pixel value P2 are within the threshold value Th. Thus, the values of pixels P0 and P1 can be directly output as F0 and F1, respectively. In the case of the values of pixels P3 and P4, variations from the target pixel P2 exceed the threshold value Th. Thus, the value of the target pixel P2 is used and output as pixel values F3 (=P2) and F4 (=P2).

Figure 9B:
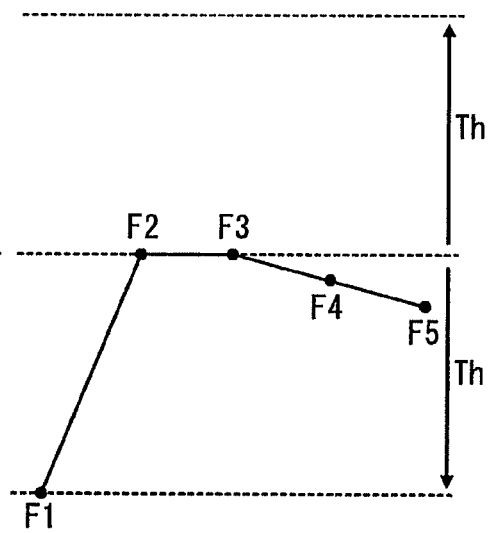

FIG. 9A illustrates an example of processing where the target pixel shifts from P2 to P3. When the pixel P3 is set to the target pixel, the threshold value Th is again set with reference to the target pixel P3 as a center. If the target pixel is set to P3, then variations of pixels P1, P4, and P5 among the surrounding pixels with respect to the target pixel P3 are within the threshold range, while variations thereof with respect to the pixel P2 are out of the threshold range. Therefore, as shown in FIG. 9B, pixel values F1, F4, and F5, where variations thereof with respect to the target pixel P3 are within the range of the threshold value Th, remain the values of pixels P1, P4, and P5 in FIG. 9A without change, respectively. The value of the target pixel P3 substitutes for the pixel value F2.

Figure 10:
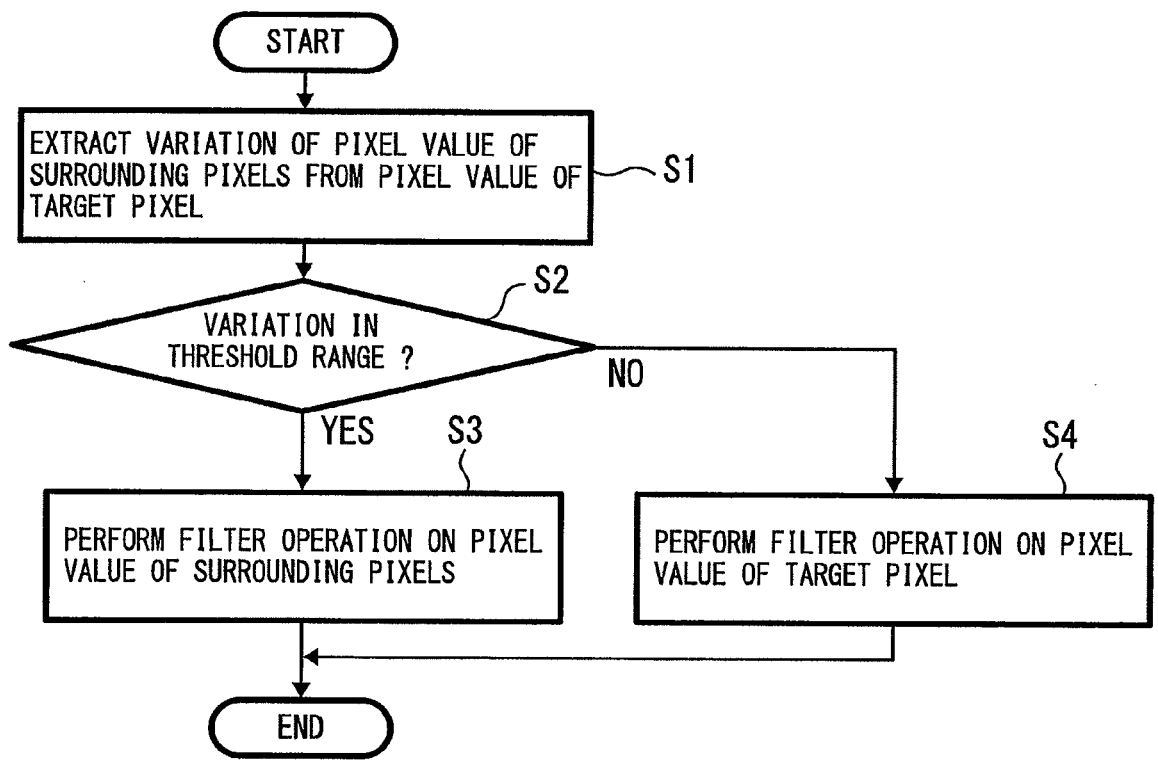
FIG. 10 is a flowchart illustrating an example of the filter processing of the edge-preserving smoothing filter in accordance with an embodiment of the invention.

FIG. 10 illustrates a flowchart of an example of processing of the edge-preserving smoothing filter 121. As shown in FIG. 10, first, variations of the values of pixels surrounding the target pixel from the value of the target pixel are extracted (Step S1). Then, a determination is made whether the variation is within the range of threshold value Th (Step S2). If the variation is within the range of threshold value Th, then the filter operation is performed on the pixel value of the surrounding pixels (Step S3). If the variation exceeds the threshold value Th, then the filter operation is performed on the pixel value of the target pixel (Step S4). Note that the filter operation is performed at the last after repeating the process of determining the pixel value to receive the operation as many times as the number of taps of the filter The process carried out as described above retains, for example, a comparatively large change from the value of pixel P2 to the value of pixel P3 as shown in FIG. 8A while smoothing a comparatively small amplification (high frequency component) with respect the threshold with a center on the target pixel value. Then, a high precision component at a level not determined by quantization is reproduced on the basis of the smoothed signal. Here, the signal including the generated high precision component shows high relativity to the original signal, compared with random noise or the like.

Referring back to FIG. 7, an "a"-bit digital signal is input in the edge-preserving smoothing filter 121. The signal is then processed as described above in the edge-preserving smoothing filter 121. As a result, the signal is output as a signal with a length of "a'+b" bits containing a "b"-bit high precision component. This signal is input in the high-precision component separating part 123 and the "b"-bit high precision component is then separated therefrom. Subsequently, a high-precision component adding part 124 adds the "b"-bit signal separated by the high-precision component separating part 123 to the lowest bit of the original signal of "a" bits. Consequently, a signal with reproduced quantization accuracy can be obtained. It should be noted that the number of bits separated in the high-precision component separating part 123 can be optionally set to any number of bits.

Since the video camera is configured as described above, it is possible to eliminate an effect of the high-frequency component, while allowing the quantization accuracy to be reproduced. Thus, the dimensions of the circuit can be minimized.

In addition, since the epsilon ($\epsilon$) filter is used, an effect of a high-frequency component can be removed, so that more suitable quantization accuracy can be reproduced.

In addition, the epsilon ($\epsilon$) filter retains an unexpected large amplitude change component of the signal, so that a high precision component with high relativity to the original signal can be generated even at a portion having a large change in amplitude, such as an edge or an impulse.

Furthermore, the above embodiment describes an example that employs the epsilon ($\epsilon$) filter as an edge-preserving smoothing filter. However, any type of edge-preserving smoothing filter, for example, a bilateral filter such as a Gaussian filter or a box filter, or other filters may be used.

Furthermore, the above-described embodiment is applied to the video camera having the imaging part and the analog/digital converting part. Alternatively, an embodiment of the invention can be applied to a signal processing apparatus for carrying out the above-described signal processing (process of reproducing quantization accuracy) by inputting an analog signal or a digital signal, an information processing apparatus, or the like.

Examples of the information processing apparatus include computers, printers, game consoles, personal digital assistants (e.g., handheld computers, mobile phones, portable video game players, and electronic books), image reproducing apparatuses (e.g., optical disk devices and home servers), monitors, television receivers, and audio signal reproducing apparatuses and the like.

Figure 11:
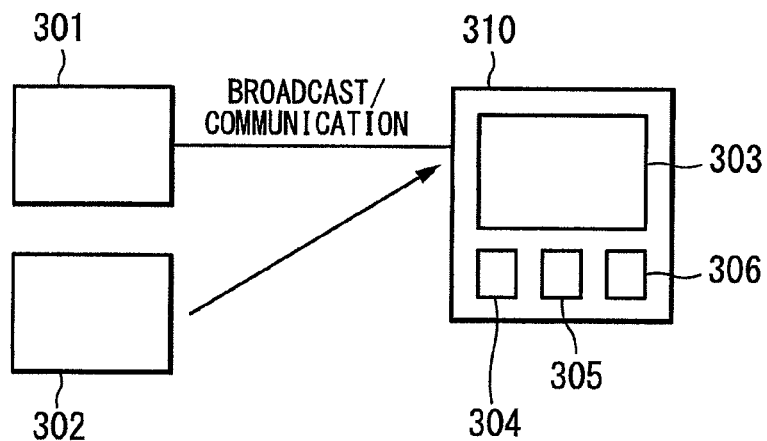
FIG. 11 is a schematic diagram illustrating an example of configuration of an information processing apparatus in accordance with another embodiment of the invention.

FIG. 11 illustrates an example of mounting a quantization-accuracy reproducing circuit 304 on an information processing apparatus 310. The information processing apparatus 310 shown in FIG. 10 includes an external interface part 306 for receiving broadcast signals and communication data sent from a transmission device 301 and a medium 302; a signal processing part 305; a quantization-accuracy reproducing circuit 304; and a display part 303. Furthermore, in the example shown in FIG. 11, the information processing apparatus 310 includes the display part 303. However, the information processing apparatus 310 is not limited to such a configuration, so that it may be an information processing apparatus without a display part.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
an imaging part;
an analog/digital converting part for converting a video signal obtained by the imaging part into a digital signal;
an edge-preserving smoothing filter, where each of pixels constituting the video signal output from the analog/digital converting part is subjected to a predetermined filter operation to generate an output signal containing a high-precision component at a level not determined by quantization in the analog/digital converting part, wherein the filter has a characteristic of smoothing a small amplitude signal while maintaining a component with an unexpected large amplitude change in the signal, wherein a set of predetermined number of pixels including a target pixel and surrounding pixels thereof is obtained, and pixel values for the target pixel and each surrounding pixel are determined as follows: the predetermined filter operation is carried out on each surrounding pixel that is within a predetermined threshold range of the target pixel, and when the surrounding pixel exceeds the predetermined threshold range of the target pixel, the predetermined filter operation is carried out on the target pixel instead of the surrounding pixel that exceeded the predetermined threshold range;
a high-precision component separating part for separating the high precision component from the signal output from the edge-preserving smoothing filter; and
a high-precision component adding part for adding the high precision component separated from the high-precision component separating part to the signal output from the analog/digital converting part,
wherein the filter operation is performed after repeating the process of determining the pixel value to receive the operation as many times as the number of taps of the filter, wherein the edge-preserving smoothing filter is an epsilon ($\epsilon$) filter, thereby generating a signal with reproduced quantization accuracy, while removing the effects of high frequency components included in the video signal, and wherein the high-precision component adding part adds the high precision component separated by the high-precision component separating part to the lowest bit of the video signal output from the analog/digital converting part.

2. The imaging apparatus according to claim 1, wherein the high-precision component separating part separates a high precision component of a predetermined number of bits from the signal output from the edge-preserving smoothing filter.

3. A signal processing circuit, comprising:
an edge-preserving smoothing filter, where each of pixels constituting an input digital signal is subjected to a predetermined filter operation to generate an output signal containing a high-precision component at a level not determined by quantization of the input digital signal, wherein the filter has a characteristic of smoothing a small amplitude signal while maintaining a component with an unexpected large amplitude change in the signal, wherein a set of predetermined number of pixels including a target pixel and surrounding pixels thereof is obtained, and pixel values for the target pixel and each surrounding pixel are determined as follows: the predetermined filter operation is carried out on each surrounding pixel that is within a predetermined threshold range of the target pixel, and when the surrounding pixel exceeds the threshold range of the target pixel, the predetermined filter operation is carried out on the target pixel instead of the surrounding pixel that exceeded the predetermined threshold range;

a high-precision component separating part for separating the high precision component from the signal output from the edge-preserving smoothing filter; and a high-precision component adding part for adding the high precision component separated from the high-precision component separating part to the input digital signal, wherein the filter operation is performed after repeating the process of determining the pixel value to receive the operation as many times as the number of taps of the filter, wherein the edge-preserving smoothing filter is an epsilon ($\epsilon$) filter, thereby generating a signal with reproduced quantization accuracy, while removing the effects of high frequency components included in the video signal, and wherein the high-precision component adding part adds the high precision component separated by the high-precision component separating part to the lowest hit of the video signal.

4. A signal processing apparatus, comprising:

an edge-preserving smoothing filter, where each of pixels constituting an input digital signal is subjected to a predetermined filter operation to generate an output signal containing a high-precision component at a level not determined by quantization of the input digital signal, wherein the filter has a characteristic of smoothing a small amplitude signal while maintaining a component with an unexpected large amplitude change in the signal, wherein a set of predetermined number of pixels including a target pixel and surrounding pixels thereof is obtained, and pixel values for the target pixel and each surrounding pixel are determined as follows: the predetermined filter operation is carried out on each surrounding pixel that is within a predetermined threshold range of the target pixel, and when the surrounding pixel exceeds the predetermined threshold range, the predetermined filter operation is carried out on the target pixel instead;

a high-precision component separating part for separating the high precision component from the signal output from the edge-preserving smoothing filter; and a high-precision component adding part for adding the high precision component separated from the high-precision component separating part to the input digital signal, wherein the filter operation is performed after repeating the process of determining the pixel value to receive the operation as many times as the number of taps of the filter, wherein the edge-preserving smoothing filter is an epsilon ($\epsilon$) filter, thereby generating a signal with reproduced quantization accuracy, while removing the effects of high frequency components included in the video signal, and wherein the high-precision component adding part adds the high precision component separated by the high-precision component separating part to the lowest bit of the video signal.

5. A signal processing method, comprising the steps of:

generating an output signal containing a high-precision component at a level not determined by quantization of an input digital signal by subjecting each of pixels constituting the input digital signal to a predetermined filter operation such that a set of a predetermined number of pixels including a target pixel and surrounding pixels thereof is obtained, and pixel values for the target pixel and each surrounding pixel are determined as follows: the predetermined filter operation is carried out on each surrounding pixel that is within a predetermined threshold range, and when the surrounding pixel exceeds the threshold range, the predetermined filter operation is carried out on the target pixel in place thereof;

separating the high precision component from the signal output from the edge-preserving smoothing filter; and adding the high precision component separated from the high-precision component separating part to the input digital signal, wherein the filter operation is performed after repeating the process of determining the pixel value to receive the operation as many times as the number of taps of the filter, wherein the edge-preserving smoothing filter is an epsilon ($\epsilon$) filter, thereby generating a signal with reproduced quantization accuracy, while removing the effects of high frequency components included in the video signal, and wherein the high-precision component adding step adds the high precision component separated by the high-precision component separating step to the lowest bit of the video signal.

6. A non-transitory computer program product, executing the steps of:

generating an output signal containing a high-precision component at a level not determined by quantization of an input digital signal by subjecting each of pixels constituting the input digital signal to a predetermined filter operation such that a set of predetermined number of pixels including a target pixel and surrounding pixels thereof is obtained, and pixel values for the target pixel and each surrounding pixel are determined as follows: the predetermined filter operation is carried out on each surrounding pixel that is within a predetermined threshold range, and when the surrounding pixel exceeds the predetermined threshold range, the predetermined filter operation is carried out on the target pixel;

separating the high precision component from the signal output from the edge-preserving smoothing filter; and adding the high precision component separated from the high-precision component separating part to the input digital signal, wherein the filter operation is performed after repeating the process of determining the pixel value to receive the operation as many times as the number of taps of the filter, wherein the edge-preserving smoothing filter is an epsilon ($\epsilon$) filter, thereby generating a signal with reproduced quantization accuracy, while removing the effects of high frequency components included in the video signal, and wherein the high-precision component adding step adds the high precision component separated by the high-precision component separating step to the lowest bit of the video signal.

* * * * *